(12) United States Patent
Fan et al.

(10) Patent No.: US 10,330,857 B2
(45) Date of Patent: Jun. 25, 2019

(54) DISPLAY DEVICE

(71) Applicant: CHAMP VISION DISPLAY INC., Hukou Township, Hsinchu County (TW)

(72) Inventors: Cheng-Wei Fan, Hsin-Chu (TW); Kuo-Lung Lin, Hsin-Chu (TW); Chiao-Chih Yang, Hsin-Chu (TW); Huei-Tzu Lin, Hsin-Chu (TW)

(73) Assignee: CHAMP VISION DISPLAY INC., Hukou Township, Hsinchu County (TW)

( * ) Notice: Subject to any disclaimer, the term of this patent is extended or adjusted under 35 U.S.C. 154(b) by 0 days.

(21) Appl. No.: 15/490,705

(22) Filed: Apr. 18, 2017

(65) Prior Publication Data

US 2017/0371093 A1    Dec. 28, 2017

(30) Foreign Application Priority Data

Jun. 23, 2016    (TW) .............................. 105119694 A

(51) Int. Cl.
*F21V 8/00* (2006.01)
*G02F 1/1333* (2006.01)

(52) U.S. Cl.
CPC ......... *G02B 6/0088* (2013.01); *G02B 6/0076* (2013.01); *G02F 1/13338* (2013.01); *G02F 1/133308* (2013.01); *G02F 1/133382* (2013.01); *G02B 6/0063* (2013.01); *G02B 6/0068* (2013.01); *G02F 2001/133342* (2013.01)

(58) Field of Classification Search
CPC .......... G02F 1/133308; G02F 1/13338; G02F 1/133382

USPC .......................................................... 362/613
See application file for complete search history.

(56) References Cited

U.S. PATENT DOCUMENTS

| 8,523,422 B2 * | 9/2013 | Yu ........................ G02B 6/0091 362/633 |
| 8,714,802 B2 * | 5/2014 | Chen ....................... G06F 3/041 362/606 |
| 2004/0095740 A1 * | 5/2004 | Mai ....................... G02B 6/0055 362/23.16 |

(Continued)

FOREIGN PATENT DOCUMENTS

| CN | 201322255 Y | 10/2009 |
| CN | 203192326 U | 9/2013 |

(Continued)

*Primary Examiner* — Bryon T Gyllstrom
(74) *Attorney, Agent, or Firm* — Cheng-Ju Chiang

(57) ABSTRACT

A display device including a plate, a first display module, a second display module, a first frame and a second frame is provided. The plate has a first surface and a second surface opposite to each other. The first display module and the second display module are disposed on the first surface and the second surface of the plate respectively. A display direction of the first display module and a display direction of the second display module are opposite to each other. The first frame is disposed on the first surface of the plate and surrounds the first display module. The first frame is for carrying the first display module. The second frame is disposed on the second surface of the plate and surrounds the second display module. The second frame is for carrying the second display module. The plate is clamped by the first frame and the second frame.

12 Claims, 3 Drawing Sheets

1a

(56) References Cited

U.S. PATENT DOCUMENTS

| | | | |
|---|---|---|---|
| 2006/0181897 A1* | 8/2006 | Ueno | G02B 6/0036 362/600 |
| 2007/0147088 A1* | 6/2007 | Chien | G02B 6/0038 362/616 |
| 2013/0057779 A1* | 3/2013 | Takata | G02F 1/133308 348/790 |
| 2013/0135536 A1* | 5/2013 | Kuromizu | G02B 6/0068 348/739 |
| 2013/0265784 A1* | 10/2013 | Nieberle | F21S 8/00 362/382 |
| 2014/0028931 A1* | 1/2014 | Tsurusaki | G06F 3/041 349/12 |
| 2014/0063416 A1* | 3/2014 | Shimizu | G02B 6/005 349/65 |
| 2016/0131934 A1* | 5/2016 | Hwang | G02F 1/133528 257/59 |

FOREIGN PATENT DOCUMENTS

| | | |
|---|---|---|
| CN | 103398275 | 11/2013 |
| CN | 102625633 B | 11/2014 |
| CN | 204100058 U | 1/2015 |
| CN | 102902121 B | 5/2015 |
| JP | 2006091435 A | 4/2006 |
| TW | I259716 | 8/2006 |
| TW | I339755 B | 4/2011 |

* cited by examiner

DISPLAY DEVICE

CROSS-REFERENCE TO RELATED APPLICATION

This application claims the priority benefit of TW105119694 filed on 2016 Jun. 23. The entirety of the above-mentioned patent application is hereby incorporated by reference herein and made a part of this specification.

BACKGROUND OF THE INVENTION

Field of the Invention

The invention relates to a display device, and more particularly to a double-sided display device.

Description of Related Art

Because of having a trend of being lighting and thinning, LCD has been widely used in various consumer electronics products. Currently, besides single-sided display devices, more and more applications of double-sided display devices exist on market. In general, most of the technologies and structures of the double-sided display device is implemented by assembling two single-sided display devices. However, the structure of the double-sided display device implemented by two single-sided display devices may have some problems such as having a rapidly increased thickness on its module, thereby failing to achieve the trend of being lighting and thinning. Further, the double-sided display device implemented by two single-sided display devices needs more components to achieve the objective of bonding and carrying. As a result, the weight, thickness and cost of the overall module will rapidly increase. Therefore, how to improve the aforementioned problems is a concerned focus for the persons in the art.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

One objective of the invention is to provide a display device having simplified structure and being lighting and thinning.

Other objectives and advantages of the invention can be further illustrated by the technical features broadly embodied and described as follows.

In order to achieve one or a portion of or all of the objectives or other objectives, the invention provides a display device, which includes a plate, a first display module, a second display module, a first frame and a second frame. The plate has a first surface and a second surface opposite to each other. The first display module is disposed on the first surface of the plate. The second display module is disposed on the second surface of the plate. A display direction of the first display module and a display direction of the second display module are opposite to each other. The first frame is disposed on the first surface of the plate and surrounds the first display module. The first frame is for carrying the first display module. The second frame is disposed on the second surface of the plate and surrounds the second display module. The second frame is for carrying the second display module. The plate is clamped by the first frame and the second frame.

In summary, the display device of the embodiment of the invention is a double-sided display device. The double-sided display device is disposed with a single plate on which a first display module and a second display module are disposed. Therefore, compared with a conventional double-sided display device with a structure having two single-sided display devices, the double-sided display device of the embodiment of the invention is lighter and thinner and also has a reduced manufacturing cost. Further, by utilizing a design of fixedly clamping the single plate through a first frame and a second frame, the double-sided display device of the embodiment of the invention increases the strength of the overall structure efficiently, thereby avoiding the double-sided display device from the problem of insufficient structural strength due to the design of being lighting and thinning.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
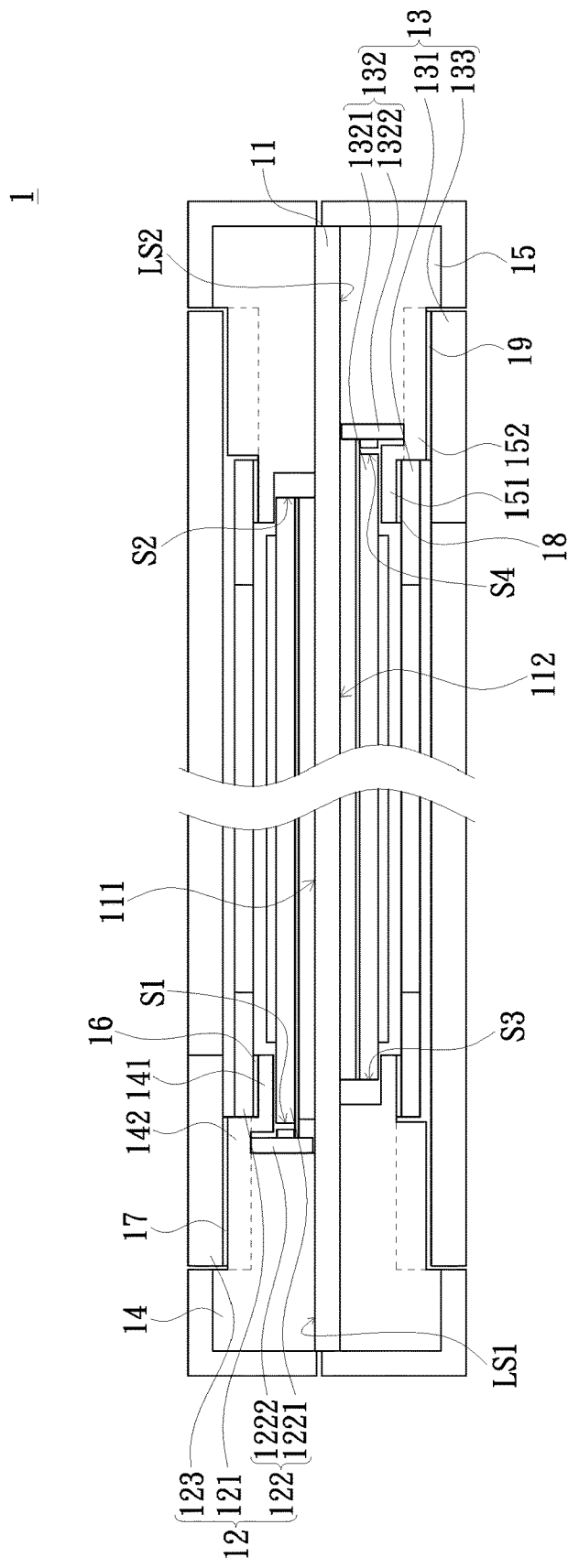
FIG. 1 is a schematic cross-sectional view of a display device in accordance with an embodiment of the invention.

Please refer to FIG. 1, which is a schematic cross-sectional view of a display device in accordance with an embodiment of the invention. As shown in FIG. 1, the display device 1 of the embodiment includes a plate 11, a first display module 12, a second display module 13, a first frame 14 and a second frame 15. The plate 11 has a first surface 111 and a second surface 112 opposite to each other. The first display module 12 is disposed on the first surface 111 of the plate 11. The second display module 13 is disposed on the second surface 112 of the plate 11. In the embodiment, the display direction of the first display module 12 and the display direction of the second display module 13 are opposite to each other; that is, the display surface of the first display module 12 and the display surface of the second display module 13 face the opposite directions. The first frame 14, disposed on the first surface 111 of the plate 11 and surrounding the first display module 12, is for carrying the first display module 12. The second frame 15, disposed on the second surface 112 of plate 11 and surrounding the second display module 13, is for carrying the second display module 13. In the embodiment, the display device 1 is disposed with one plate 11 only and the plate 11 is clamped by the first frame 14 and the second frame 15. In the embodiment, the first frame 14 has a rectangular space for accommodating and positioning the first display module 12; and the second frame 15 has a rectangular space for accommodating and positioning the second display module 13.

The detailed structure of the display device 1 of the embodiment will be further described in the following.

As shown in FIG. 1, the first display module 12 of the embodiment includes a first display panel 121 and a first backlight unit 122. Specifically, the first backlight unit 122 is located between the first display panel 121 and the first surface 111 of the plate 11; and the first frame 14 carries the first display panel 121 and surrounds the first backlight unit 122. The second display module 13 of the embodiment includes a second display panel 131 and a second backlight unit 132. Specifically, the second backlight unit 132 is located between the second display panel 131 and the second surface 112 of the plate 11; and the second frame 15 carries the second display panel 131 and surrounds the second backlight unit 132.

As shown in FIG. 1, the first backlight unit 122 of the embodiment includes a first light guide plate 1221 and a first light source 1222. The first light guide plate 1221 has a first side surface S1 and a second side surface S2 opposite to each other. The first light source 1222 is located beside the first side surface S1 of the first light guide plate 1221. The beam (not shown) emitting from the first light source 1222 is adapted to enter into the first light guide plate 1221 through the first side surface S1. The second backlight unit 132 of the embodiment includes a second light guide plate 1321 and a second light source 1322. The second light guide plate 1321 has a third side surface S3 and a fourth side surface S4 opposite to each other. The second light source 1322 is located beside the fourth side surface S4 of the second light guide plate 1321. The beam (not shown) emitting from the second light source 1322 is adapted to enter into the second light guide plate 1321 through the fourth side surface S4. In the embodiment, the first side surface S1 of the first light guide plate 1221 and the third side surface S3 of the second light guide plate 1321 are located on the same side; and the second side surface S2 of the first light guide plate 1221 and the fourth side surface S4 of the second light guide plate 1321 are located on the same side. That is, the first light source 1222 and the second light source 1322 are located on the two opposite sides (the first side surface S1 and the fourth side surface S4) respectively. It is to be noted that both of the first backlight unit 122 and the second backlight unit 132 of the embodiment include some components such as optical film assembly and reflective sheet; however, because these components are not the essential features of the invention, no redundant detail about these components is to be given herein.

In the embodiment as shown in FIG. 1, the first surface 111 and the second surface 112 of the plate 11 are flat surfaces for example, but the invention is not limited thereto. The first surface 111 of the plate 11 includes a first light source disposing surface LS1; and the second surface 112 of the plate 11 includes a second light source disposing surface LS2. That is, the first light source disposing surface LS1 and the second light source disposing surface LS2 are located on the two opposite sides of the plate 11 respectively. The first light source 1222 is aligned on the first light source disposing surface LS1 of the plate 11; and the first light source disposing surface LS1 is located between the first light source 1222 and the second frame 15. The second light source 1322 is aligned on the second light source disposing surface LS2 of the plate 11; and the second light source disposing surface LS2 is located between the second light source 1322 and the first frame 14. Namely, the first light source 1222 and the second light source 1322 of the embodiment are located above and under the plate 11 respectively. Further, in the embodiment, the plate 11 is a metal plate for example; and the material of the first frame 14 and the second frame 15 is metal material for example. Because both of the metal plate and the metal material have a good effect of heat conduction, therefore, the thermal energy generated by the first light source 1222 and the second light source 1322 can be dissipated by a heat conduction path formed by the plate 11, the first frame 14 and the second frame 15.

As shown in FIG. 1, the first display module 12 of the embodiment further includes a first touch panel 123. The first frame 14 carries the first touch panel 123; and the first display panel 121 is located between the first touch panel 123 and the first backlight unit 122. The second display module 13 of the embodiment further includes a second touch panel 133. The second frame 15 carries the second touch panel 133; and the second display panel 131 is located between the second touch panel 133 and the second backlight unit 132. In the embodiment, the first frame 14 includes a first carrying part 141 and a second carrying part 142; and the second frame 15 includes a third carrying part 151 and a fourth carrying part 152. The first carrying part 141 is located between the first display panel 121 and the first backlight unit 122; and the first carrying part 141 is adapted to carry the first display panel 121. The second carrying part 142 is located between the first touch panel 123 and the first backlight unit 122; and the second carrying part 142 is adapted to carry the first touch panel 123. In the embodiment, the first carrying part 141 and the second carrying part 142 of the first frame 14 represent a ladder structure, but the invention is not limited thereto. The third carrying part 151 is located between the second display panel 131 and the second backlight unit 132; and the third carrying part 151 is adapted to carry the second display panel 131. The fourth carrying part 152 is located between the second touch panel 133 and the second backlight unit 132; and the fourth carrying part 152 is adapted to carry the second touch panel 133. In the embodiment, the third carrying part 151 and the fourth carrying part 152 of the second frame 15 represent a ladder structure, but the invention is not limited thereto. Further, the first light source 1222, the first display panel 121, the first touch panel 123, the second light source 1322, the second display panel 131 and the second touch panel 133 of the embodiment perform the heat dissipation through the first frame 14 and the second frame 15 with metal material in a direction perpendicular to the display direction of the first display module 12 and the display direction of the second display module 13, that is, perform the heat dissipation toward the side direction of the display device 1. And thus, the display device 1 can have a good effect of heat dissipation and also achieve an effect of being overall lighting and thinning without additionally disposed with heat dissipating fins.

Further, in another embodiment of the invention, the second carrying part 142 of the first frame 14 and the fourth carrying part 152 of the second frame 15 are detachable structures for example; namely, the second carrying part 142 is detachably connected to the first frame 14 and the fourth carrying part 152 is detachably connected to the second frame 15. Under this structural design, the second carrying part 142 can be detached from the first touch panel 123 at the same time when the first touch panel 123 is detached from the display device 1; and the fourth carrying part 152 can be detached from the second touch panel 133 at the same time when the second touch panel 133 is detached from the display device 1. As a result, the display device 1 of the embodiment has a good assembling/disassembling duplication.

As shown in FIG. 1, the display device 1 of the embodiment further includes a first heat insulating adhesive tape 16, a second heat insulating adhesive tape 17, a third heat insulating adhesive tape 18 and a fourth heat insulating adhesive tape 19. The first heat insulating adhesive tape 16 is disposed between the first carrying part 141 and the first display panel 121; and the first display panel 121 is fixed to the first carrying part 141 of the first frame 14 through the first heat insulating adhesive tape 16. The first heat insulating adhesive tape 16 insulates the heat conduction between the first light source 1222 and the first display panel 121 efficiently. The second heat insulating adhesive tape 17 is disposed between the second carrying part 142 and the first touch panel 123; and the first touch panel 123 is fixed to the second carrying part 142 of the first frame 14 through the second heat insulating adhesive tape 17. The second heat insulating adhesive tape 17 insulates the heat conduction between the first light source 1222 and the first touch panel 123 efficiently. The third heat insulating adhesive tape 18 is disposed between the third carrying part 151 and the second display panel 131; and the second display panel 131 is fixed to the third carrying part 151 of the second frame 15 through the third heat insulating adhesive tape 18. The third heat insulating adhesive tape 18 insulates the heat conduction between the second light source 1322 and the second display panel 131 efficiently. The fourth heat insulating adhesive tape 19 is disposed between the fourth carrying part 152 and the second touch panel 133; and the second touch panel 133 is fixed to the fourth carrying part 152 of the second frame 15 through the fourth heat insulating adhesive tape 19. The fourth heat insulating adhesive tape 19 insulates the heat conduction between the second light source 1322 and the second touch panel 133 efficiently. And thus, the damages of the first display panel 121, the first touch panel 123, the second display panel 131 and the second touch panel 133 resulted by overheat are avoided.

Further, in another embodiment of the invention, the material of the first carrying part 141 and the second carrying part 142 of the first frame 14 and the third carrying part 151 and the fourth carrying part 152 of the second frame 15 is heat insulating material for example. The material of the first frame 14, except the portion of the first carrying part 141 and the second carrying part 142, is metal material; and the material of the second frame 15, except the portion of the third carrying part 151 and the fourth carrying part 152, is metal material. The carrying part with the heat insulating material and the frame with the metal material are distinguished by dotted lines in figure; however, it is understood that size of the carrying part is not limited in the invention. Because both of the first carrying part 141 and the second carrying part 142 have the effect of heat insulation, the first carrying part 141 can insulate the heat conduction between the first light source 1222 and the first display panel 121 efficiently and the second carrying part 142 can insulate the heat conduction between the first light source 1222 and the first touch panel 123 efficiently. Based on the same manner, the third carrying part 151 can insulate the heat conduction between the second light source 1322 and the second display panel 131 efficiently and the fourth carrying part 152 can insulate the heat conduction between the second light source 1322 and the second touch panel 133 efficiently. Under this structural design, the damages of the first display panel 121, the first touch panel 123, the second display panel 131 and the second touch panel 133 resulted by overheat are also avoided.

Figure 2:
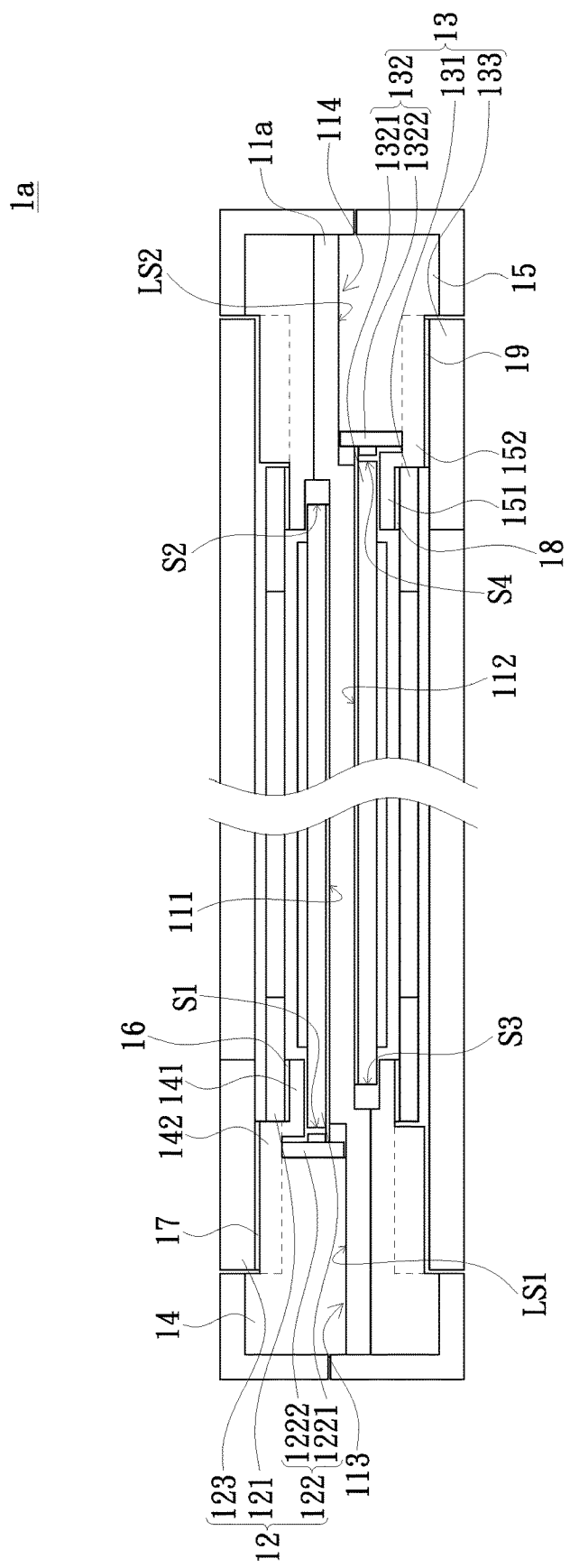
FIG. 2 is a schematic cross-sectional view of a display device in accordance with another embodiment of the invention.

Please refer to FIG. 2, which is a schematic cross-sectional view of a display device in accordance with another embodiment of the invention. The display device 1a of the embodiment is similar to the display device 1 of FIG. 1. Differences lie in that the plate 11a of the display device 1a of the embodiment has a first concave part 113 which is concave in a direction away from the first display panel 121 and a second concave part 114 which is concave in a direction away from the second display panel 131; and the first surface 111 and the second surface 112 located between the first concave part 113 and the second concave part 114 are flat structures. The first concave part 113 is located between the first light source 1222 and the second frame 15; and the first light source 1222 is aligned to the first concave part 113 of the plate 11a. Specifically, a portion or entire of the first light source 1222 is accommodated in the first concave part 113. The second concave part 114 is located between the second light source 1322 and the first frame 14; and the second light source 1322 is aligned to the second concave part 114 of the plate 11a. Specifically, a portion or entire of the second light source 1322 is accommodated in the second concave part 114. That is, the first concave part 113 and the second concave part 114 are located on the two opposite sides of the plate 11a. In the embodiment, the first concave part 113 and the second concave part 114 are concave in two opposite directions, thereby forming the accommodating spaces for accommodating the first light source 1222 and the second light source 1322 respectively. The distance of the concavity of the first concave part 113 and the second concave part 114 also represents the distance of the reduced thickness of the overall display device 1a. Therefore, under the structural design of the embodiment, the thickness of the overall display device 1a is further reduced and the purpose of being lighting and thinning is achieved accordingly.

Figure 3:
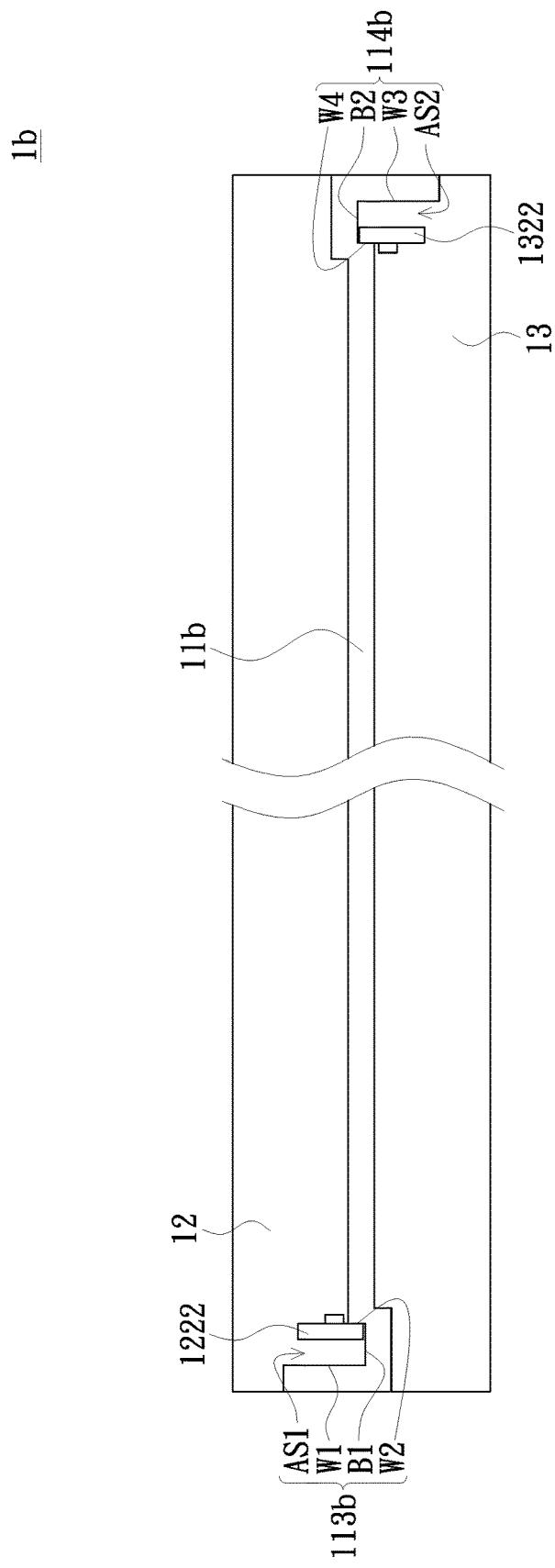
FIG. 3 is a schematic cross-sectional view of a display device in accordance with another embodiment of the invention.

Please refer to FIG. 3, which is a schematic cross-sectional view of a display device in accordance with another embodiment of the invention. The display device 1b of the embodiment is similar to the display device 1a of FIG. 2. Difference lie in that the first concave part 113b, concave in a direction away from the first display panel 121, of the plate 11b of the display device 1b of the embodiment includes a first side wall W1 and a second side wall W2 opposite to each other and a first bottom wall B1 adjacently connected between the first side wall W1 and the second side wall W2; and the second concave part 114b concave in a direction away from the second display panel 131 includes a third side wall W3 and a fourth side wall W4 opposite to each other and a second bottom wall B2 adjacently connected between the third side wall W3 and the fourth side wall W4. The first bottom wall B1 is located between the first light source 1222 and the second frame 15; a first accommodating space AS1 is defined by the first side wall W1, the second side wall W2 and the first bottom wall B1; and a portion or entire of the first light source 1222 is located in the first accommodating space AS1. The second bottom wall B2 is located between the second light source 1322 and the first frame 14; a second accommodating space AS2 is defined by the third side wall W3, the fourth side wall W4 and the second bottom wall B2; and a portion or entire of the second light source 1322 is located in the second accommodating space AS2.

It is to be noted that the structural design of the display device 1 of FIG. 1, the display device 1a of FIG. 2 or the display device 1b of FIG. 3 is applicable to a display device with pure display function for example. Namely, in another embodiment, the first display module 12 and the second display module 13 may include only the first display panel 121 and the second display panel 132 without the first touch panel 123 and the second touch panel 133 respectively.

In summary, the display device of the embodiment of the invention is a double-sided display device. The double-sided display device is disposed with a single plate on which a first display module and a second display module are disposed. Therefore, compared with a conventional double-sided display device with a structure having two single-sided display devices, the double-sided display device of the embodiment of the invention is lighter and thinner and also has a reduced manufacturing cost. Further, by utilizing a design of fixedly clamping the single plate through a first frame and a second frame, the double-sided display device of the embodiment of the invention increases the strength of the overall structure efficiently, thereby avoiding the double-sided display device from the problem of insufficient structural strength due to the design of being lighting and thinning.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first stop part, the second stop part, the first ring part and the second ring part are only used for distinguishing various elements and do not limit the number of the elements.

What is claimed is:

1. A display device, comprising:
   a plate having a first surface, a second surface opposite to the first surface, a first concave part formed by concaving the first surface and protruding from the second surface, and a second concave part formed by concaving the second surface and protruding from the first surface;
   a first display module disposed on the first surface of the plate;
   a second display module disposed on the second surface of the plate, wherein a display direction of the first display module and a display direction of the second display module are opposite to each other;
   a first frame disposed on the first surface of the plate and surrounding the first display module, wherein the first frame is for carrying the first display module; and
   a second frame disposed on the second surface of the plate and surrounding the second display module, wherein the second frame is for carrying the second display module, wherein the plate is clamped by the first frame and the second frame, wherein the first frame and the second frame are separated by the plate.

2. The display device according to claim 1, wherein the first display module comprises a first display panel and a first backlight unit, the first backlight unit is located between the first display panel and the first surface of the plate, the first frame carries the first display panel and surrounds the first backlight unit, the second display module comprises a second display panel and a second backlight unit, the second backlight unit is located between the second display panel and the second surface of the plate, and the second frame carries the second display panel and surrounds the second backlight unit.

3. The display device according to claim 2, wherein the first backlight unit comprises a first light guide plate and a first light source, the first light guide plate has a first side surface and a second side surface opposite to each other, the first light source is located beside the first side surface of the first light guide plate, the second backlight unit comprises a second light guide plate and a second light source, the second light guide plate has a third side surface and a fourth side surface opposite to each other, the second light source is located beside the fourth side surface of the second light guide plate, the first side surface and the third side surface are located on a same side, and the second side surface and the fourth side surface are located on a same side.

4. The display device according to claim 3, wherein the first surface and the second surface of the plate are flat surfaces, the first surface of the plate comprises a first light source disposing surface, the second surface of the plate comprises a second light source disposing surface, the first light source is aligned on the first light source disposing surface of the plate and the first light source disposing surface is located between the first light source and the second frame, the second light source is aligned on the second light source disposing surface of the plate and the second light source disposing surface is located between the second light source and the first frame.

5. The display device according to claim 3, wherein the first concave part which is concave in a direction away from the first display panel and the second concave part which is concave in a direction away from the second display panel, the first concave part is located between the first light source and the second frame, the first light source is aligned to the first concave part of the plate and accommodated in the first concave part, the second concave part is located between the second light source and the first frame, and the second light source is aligned to the second concave part of the plate and accommodated in the second concave part.

6. The display device according to claim 5, wherein the first surface and the second surface located between the first concave part and the second concave part are flat surfaces.

7. The display device according to claim 5, wherein the first concave part of the plate comprises a first side wall and a second side wall opposite to each other and a first bottom wall adjacently connected between the first side wall and the second side wall, the first bottom wall is located between the first light source and the second frame, a first accommodating space is defined by the first side wall, the second side wall and the first bottom wall, the first light source is located in the first accommodating space, the second concave part comprises a third side wall and a fourth side wall opposite to each other and a second bottom wall adjacently connected between the third side wall and the fourth side wall, the second bottom wall is located between the second light source and the first frame, a second accommodating space is defined by the third side wall, the fourth side wall and the second bottom wall, and the second light source is located in the second accommodating space.

8. The display device according to claim 2, wherein the first display module further comprises a first touch panel, the first frame carries the first touch panel, the first display panel is located between the first touch panel and the first backlight unit, the second display module further comprises a second touch panel, the second frame carries the second touch panel, and the second display panel is located between the second touch panel and the second backlight unit.

9. The display device according to claim 8, wherein the first frame comprises a first carrying part and a second carrying part, the first carrying part is located between the first display panel and the first backlight unit, the first carrying part is for carrying the first display panel, the second carrying part is located between the first touch panel and the first backlight unit, the second carrying part is for carrying the first touch panel, the second frame comprises a third carrying part and a fourth carrying part, the third carrying part is located between the second display panel and the second backlight unit, the third carrying part is for carrying the second display panel, the fourth carrying part is located between the second touch panel and the second backlight unit, and the fourth carrying part is for carrying the second touch panel.

10. The display device according to claim 9, wherein a material of the first carrying part, the second carrying part, the third carrying part and the fourth carrying part is a non-metal material adapted to insulate the heat conduction.

11. The display device according to claim 9, further comprising:
   a first heat insulating adhesive tape disposed between the first carrying part and the first display panel and for fixing the first display panel to the first carrying part;
   a second heat insulating adhesive tape disposed between the second carrying part and the first touch panel and for fixing the first touch panel to the second carrying part;
   a third heat insulating adhesive tape disposed between the third carrying part and the second display panel and for fixing the second display panel to the third carrying part; and
   a fourth heat insulating adhesive tape disposed between the fourth carrying part and the second touch panel and for fixing the second touch panel to the fourth carrying part.

12. The display device according to claim 1, wherein the plate is a metal plate and a material of the first frame and the second frame is a metal material.

* * * * *